United States Patent [19]

Watson

[11] Patent Number: 4,487,797
[45] Date of Patent: Dec. 11, 1984

[54] GLASS FIBERS TO REINFORCE POLYMERIC MATERIALS

[75] Inventor: James C. Watson, Wilkinsburg, Pa.
[73] Assignee: PPG Industries, Inc., Pittsburgh, Pa.
[21] Appl. No.: 557,032
[22] Filed: Dec. 1, 1983
[51] Int. Cl.$^3$ ................................................. B32B 7/00
[52] U.S. Cl. ................................... 428/268; 65/3.43; 156/181; 427/386; 427/407.3; 428/273; 428/285; 428/288; 428/290; 428/392; 428/417; 428/426
[58] Field of Search ............... 428/251, 268, 273, 285, 428/288, 290, 392, 417, 426; 427/386, 389.8, 427/407.3; 156/181; 65/3.43

[56] References Cited

U.S. PATENT DOCUMENTS

| | | |
|---|---|---|
| 3,119,711 | 1/1964 | Starmann et al. |
| 3,249,412 | 5/1966 | Holek et al. .......... 65/3.44 |
| 3,449,281 | 6/1969 | Sullivan et al. |
| 3,475,149 | 10/1969 | Eckerle et al. |
| 3,652,326 | 3/1972 | Ward |
| 3,772,870 | 11/1973 | Wong et al. |
| 3,888,645 | 6/1975 | Marzocchi |
| 3,957,727 | 5/1976 | McLean .................. 428/268 |
| 4,039,716 | 8/1977 | Johnson |
| 4,104,434 | 8/1978 | Johnson |
| 4,110,094 | 8/1978 | Motsinger |
| 4,140,833 | 2/1979 | McCoy |
| 4,159,362 | 6/1979 | McCoy |
| 4,169,062 | 9/1979 | Weipert |
| 4,199,647 | 4/1980 | Newkirk et al. |
| 4,246,145 | 1/1981 | Molinier et al. |
| 4,271,229 | 6/1981 | Temple |
| 4,305,742 | 12/1981 | Barch et al. .......... 65/3.43 |
| 4,358,502 | 11/1982 | Dunbar .................. 65/3.43 |
| 4,390,647 | 6/1983 | Girgis |

FOREIGN PATENT DOCUMENTS

| | | |
|---|---|---|
| 56713 | 8/1968 | Luxembourg |
| 1103325 | 4/1965 | United Kingdom |
| 1136548 | 5/1966 | United Kingdom |
| 1503926 | 3/1978 | United Kingdom |

OTHER PUBLICATIONS

Trade Literature on Carbowax® Polyethylene Glycols and Pluronic Grid

Primary Examiner—James J. Bell
Attorney, Agent, or Firm—Kenneth J. Stachel

[57] ABSTRACT

Chemically treated glass fibers can be produced having improved wet-out and resin demand performance when used for reinforced polymeric matrices which have good strength properties. The treated glass fibers have the dried residue of an aqueous treating composition having a water soluble, dispersible or emulsifiable epoxy novalac type polymer, glass fiber coupling agent, a water soluble, dispersible or emulsifiable poly(oxyalkylene-oxyethylene) polyol copolymer, wherein the ethylene oxide portion is present in an amount in the range of about 10 to about 40 weight percent of the copolymer, and the copolymer is present in an effective lubricating amount, and water in a sufficient amount to allow the aqueous treating composition to be applied to the glass fibers. The epoxy novalac type polymer can be an epoxy novalac polymer or a blend of water soluble, dispersible or emulsifiable epoxy polymer and novalac polymer or a blend of the epoxy novalac polymer and water soluble or dispersible or emulsifiable epoxy polymer or polyvinyl acetate polymer. Also, the aqueous treating composition can have a glass fiber lubricant present in an effective lubricating amount. The treated glass fibers have the dried residue of the aqueous treating composition, wherein the moisture content of the treated glass fibers is in the range of about 1 to about 10 weight percent and the amount of dried residue on the glass fibers is in the range of about 0.1 to about 2 weight percent of the treated glass fiber. The poly(oxyalkyleneoxyethylene) polyol copolymer generally has a molecular weight of greater than around 1500. The treated glass fiber strands are particularly suitable for reinforcing thermosetting polymers like vinyl ester polymeric matrices.

20 Claims, 1 Drawing Figure

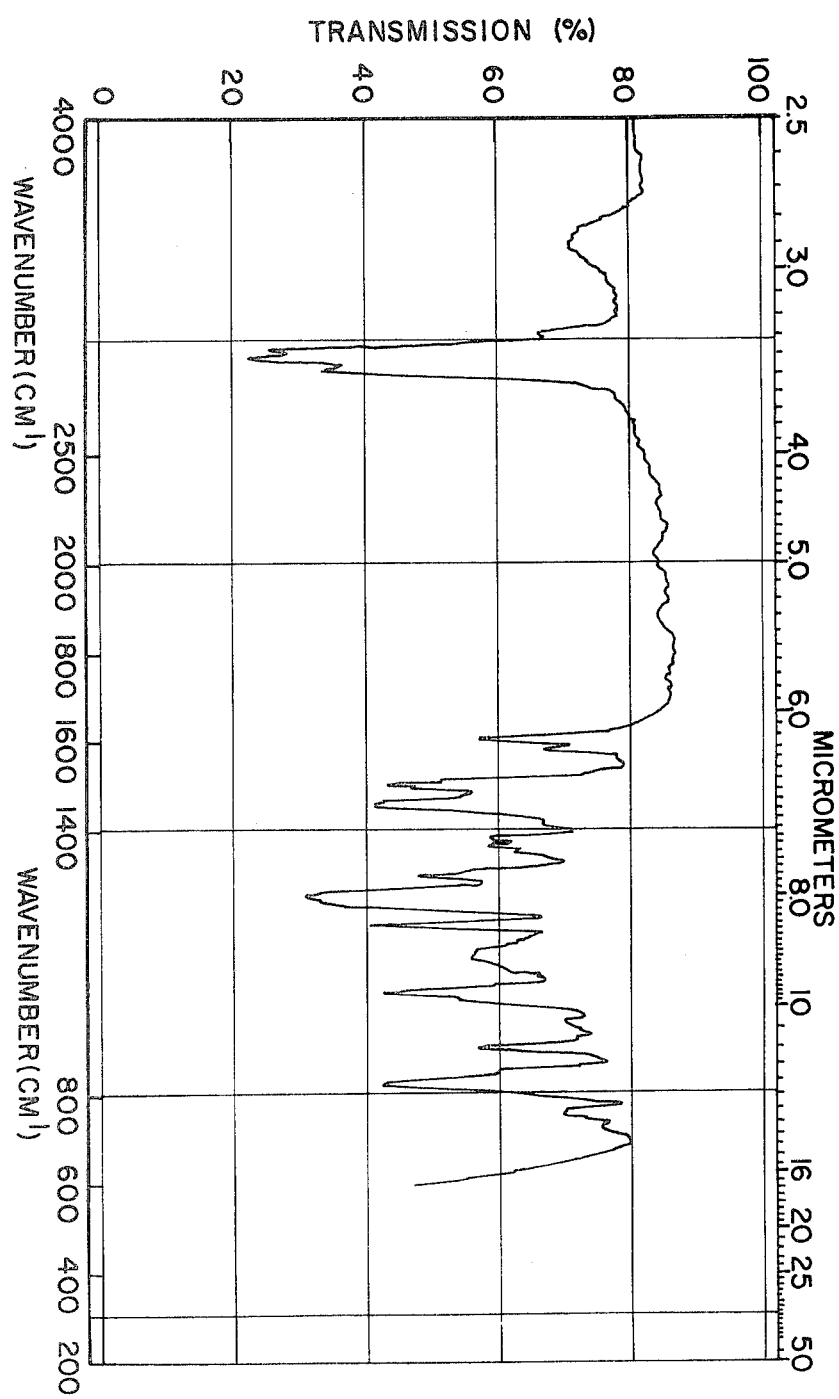

GLASS FIBERS TO REINFORCE POLYMERIC MATERIALS

The present invention relates to glass fibers in the form of continuous fibers, strands, unidirectional woven tape, roving, yarn, and woven material having improved wet-out in reinforcing polymeric matrices.

More particularly, the present invention is directed to glass fibers in the form of continuous fibers, strands, roving, yarn, unidirectional woven tape, and woven material having improved wet-out and reduced resin demand and low fuzz generation in reinforcing vinyl ester polymeric matrices.

The fiber reinforced plastics industry has used continuous glass fiber reinforcement in the form of strands, roving, yarn, unidirectional woven tape and woven cloth in such processes as filament winding, pultrusion and sundry lay-up processes. In these processes, the glass fibers are usually conveyed from a source such as a package of glass fiber strand or roving or yarn and are immersed in the uncured matrix resin. For good performance in reinforcing plastics, the glass fibers must be removed from their supply source without too much damage, such as fuzz, to the fibers. Also, the fibers must be compatible with the matrix resin to develop a good bonding relationship between the reinforcement and the matrix resin for good physical properties of the reinforced plastic.

To enable the glass fibers to meet these performance criteria, they are usually treated with a chemical composition during their formation. The chemical treatment provides compatibility with the resin matrix, good processability of the fibers in processes for producing fiber reinforced plastics, and protection for the glass fibers against interfilament abrasion.

The relationship of the glass fiber reinforcement to the polymeric matrix is governed by such factors as the wettability of the glass fibers in the resin matrix and the adhesion of the glass fibers to the polymer. In addition, another factor is the efficiency of the association between the glass fibers and the polymeric matrix, which is concerned with the wet-through nature of the glass fibers and the rate at which the matrix resin wets the particular reinforcement. These factors are important in limiting the presence of voids and the inclusion of an air interphase between the glass fibers or strands and the polymeric matrix. The wettability or "wet-out" of glass fibers during contact with the polymeric matrix; for example, in an impregnation bath in the filament winding and pultrusion processes, means that the uncured resin encapsulates the glass fibers and very little, if any, bare glass is visible in the resin coated glass fiber. Therefore, the "wet-out" of glass fibers during contact with the uncured polymeric system that will be the matrix upon cure is a measure of the apparent intimacy of contact between the uncured polymeric system and the glass fibers. If the glass fibers are not intimately "wet-out" following contact with the polymeric system, adverse affects may be experienced in processability, surface properties, and performance properties of the final, cured, reinforced polymeric material. In addition, the resin demand or the rate of wetting of the glass fibers by the polymeric matrix can also limit the strength of the cured fiber reinforced polymeric material. The fiber reinforced plastic industry is continually searching for reinforcements such as glass fibers that will have improved "wet-out" characteristics and improved resin demand characteristics.

In the filament winding, pultrusion, and woven roving industries that produce fiber reinforced plastic composites, the polymers used as the matrix of the composite have traditionally been polyesters and epoxies. Recently, the so called vinyl esters have become popular for use as the polymeric matrix. The vinyl esters have performance properties which are intermediate between epoxies and polyesters. The vinyl esters can be described as acrylic esters of epoxy resins which can be formed, for example, by the reaction of diglycidyl ether of bis-phenol A with acrylic groups to open the oxirane ring in the molecule. Therefore, these vinyl esters can be described as acrylate or methacrylate esters of epoxy resins.

It is an object of the present invention to provide chemically treated glass fibers in the form of bundles of fibers, strands, roving, yarn, unidirectional, nonwoven tape, and woven cloth, which have good "wet-out" and reduced resin demand and good processability when used in reinforcing polymeric matrices to produce fiber reinforced plastics.

It is a further object of the present invention to provide sized glass fiber strands which when used to reinforce vinyl ester polymeric matrices have good wettability, wet-out, and reduced resin demand and good processability in the vinyl ester polymers to enable the production of the fiber reinforced vinyl ester composites with good strength properties.

SUMMARY OF THE INVENTION

The foregoing objects of the invention and other objects gleaned from the following disclosure are accomplished by the present invention of glass fibers having present on a portion of their surfaces an aqueous chemical treatment or the dried residue of the aqueous chemical treatment. The aqueous chemical treatment has a water soluble, dispersible or emulsifiable epoxy novalac film forming polymer, glass fiber coupling agent, water soluble, polyoxyethylene-polyoxyalkylene block copolymer and water. The poly(alkylene oxide-b-ethylene oxide) copolymer has an amount of about 10 to about 40 weight percent of the ethylene oxide moiety and the remaining weight percent is a hydrophobic/lipophilic alkylene oxide selected from propylene oxide, butylene oxide, styrene oxide and cyclohexane oxide. The molecular weight of the block copolymer is at least 1500 and is not so great as to deter water solubility of the copolymer. The epoxy novalac polymeric film former can form a solid or a liquid film through reaction or evaporation of volatile material. The coupling agent can be any silane or Werner coupling agent. The amount of the alkylene oxide-ethylene oxide copolymer present in the treating composition is an effective lubricating amount. The amount of water in the aqueous treating composition is that amount which can control the viscosity of the treating composition so that the glass fibers can be coated with the treating composition. Also the amount of water is that amount to control the pick up of the treating composition on the glass fibers.

It is another aspect of the present invention to use the glass fibers treated with the aqueous treating composition of the present invention to reinforce polymeric materials. The process includes producing continuous glass fibers having a coating of the aqueous chemical composition, drying the glass fibers to remove a substantial amount of moisture to leave a dried residue of the aqueous treating composition on the glass fibers, conveying the glass fibers from a source, and immersing the continuous glass fibers in contact with the curable polymeric material, and curing the reinforced polymeric material.

BRIEF DESCRIPTION OF THE DRAWING

FIG. 1 is an infrared spectra of the film of the epoxy novalac cast from the emulsion used with the treated glass fibers of the present invention.

DETAILED DESCRIPTION OF THE INVENTION AND PREFERRED EMBODIMENT

The aqueous chemical treating composition present on the glass fibers of the present invention has a water soluble, dispersible or emulsifiable epoxy novalac film forming polymer. The meaning of the film forming polymer as used in this disclosure include those polymeric materials that are capable of further reaction or of a curing reaction, when the glass fibers containing the chemical treatment are combined with the matrix resin. The epoxidized novalacs are obtained from reaction of novalac resins with epihalohydrins such as epichlorohydrin. Typically, the novalac resins are produced by reacting phenol; ortho, meta, and/or paracresol or polyhydroxylated benzene compounds such as resorcinol, with a formaldehyde or aldehyde donating compound or carbonyl-containing compounds in the case of resorcinol in an acid solution. The epoxy novalacs contain from about 2 to 6 phenolic hydroxyl groups and have epoxy functionalities of from about 2 to about 5. Suitable epoxy novalac equivalent weights are from about 193 to 600 and the epoxy novalacs have a structure such as:

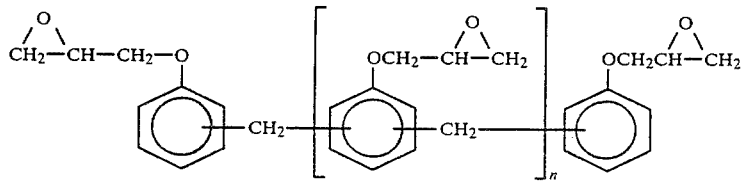

The reaction between resorcinol and a carbonyl-containing compound like acetone to produce a polymer which when epoxidized has a structure such as:

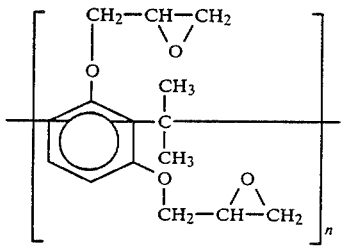

where n can vary from about 2 to about 5. The epoxy equivalent weight is the weight of the resin in grams which contains one gram equivalent of epoxy functionality. Any procedure known to those skilled in the art may be used for determining the epoxy equivalent weight. The epoxy equivalent weight of the epoxy novalac resins can be any value which permits emulsification or dispersion of the epoxy novalac polymer in water at least with the use of an organic cosolvent. The epoxy novalac emulsion can be prepared by any method known to those skilled in the art using appropriate types and amounts of nonionic, cationic, anionic and/or amphoteric emulsifiers which are compatible with the epoxy polymers. It is preferred that acid pH type emulsifiers be used.

A suitable example of the epoxy novalac emulsion that can be used for the glass fibers of the present invention is that available from Celanese Specialty Resins, 10100 Lynn Station Road, Louisville, KY 40233, under the trade designation CMD-W 55-5003 epoxy resin dispersion. This dispersion is a non-ionic aqueous dispersion of a polyfunctional aromatic epoxy resin with an average functionality of 3. The dispersion has reactive epoxide functionality. Upon evaporation of the water, the epoxy novalac resin dispersion coalesces to form a clear, continuous, tacky film at ambient temperatures. The dispersion contains no organic solvent and is completely water reducible. The epoxy dispersion has a percent non-volatile of 55%, a viscosity at 25° C., centipoise CPS by Brookfield RVT at 10 rpm of 10,000, a volatile portion which is water, pounds per gallon which is 9.2 and weight per epoxide (on solids) of 205 and an average particle size of less than or equal to 1.5 microns and a pH of 7.2. The epoxy resin dispersion is capable of fast reactivity and achievement of a high cross-linked density upon curing. The film cast from the epoxy novalac resin dispersion is shown in an infrared spectra of FIG. 1. The IR curve was obtained on a Perkin-Elmer machine using a nujol dispersion mull with a scan time of 6, a response time of 1 and a slit program of 6. The preferred epoxy novalac emulsion is the dispersion of FIG. 1.

Generally, the amount of the epoxy novalac film forming polymer present in an aqueous chemical treating composition is an effective amount for forming of film on a substantial portion of the surface of the glass fiber either by reaction from the presence of a reactive agent in the sizing composition or in the atmosphere or from the evaporation of volatiles from the sizing composition on the surface of the glass fibers. The effective film forming amount is that necessary to provide compatibility of the glass fibers with the polymer matrix to be reinforced with the glass fibers. Also, the effective film forming amount can assist in protecting the fibers in the form of strands, yarns, rovings, and woven cloth against interfilament abrasion and also assist in processability. The amount of the epoxy novalac dispersion used in an aqueous treating composition for treating glass fibers can range from about 1 to about 15 weight percent of the aqueous treating composition when the emulsion has around 55 weight percent solids.

In addition to epoxy novalac resins used as the film former in the aqueous treating composition, it is within the scope of the present invention to use blends of the water soluble, dispersible or emulsifiable epoxy resins and water soluble, dispersible or emulsifiable novalac polymers, where the blend would have similar epoxy equivalent weights to the epoxy novalac polymer. The novalac polymer would have a weight average molecular weight similar to the epoxy novalac polymer. Other blends with epoxy novalac polymers that can be used are those with water soluble, dispersible or emulsifiable polymers such as polyvinyl acetate and/or epoxy polymers. The ratio of epoxy novalac polymer to the polyvinyl acetate polymer can be on the order of about 3 to about 1. Higher values of the ratio can be used but lower values may lead to a decrease in wet-out performance of the treated glass fibers. To the contrary, the ratio of epoxy novalac polymer to epoxy polymer in a blend can range from about 99 to 1 to 1 to 99. The epoxy novalac film forming polymer and other blendable film forming polymers useful in the present invention are those that form a film on drying by the release of volatile material, but which do not fully cure upon being dried. Therefore, it is preferred to limit the presence of any curing agent in the aqueous sizing composition to produce the treated glass fibers of the present invention. Also, other components in the aqueous treating composition or size for treating the glass fibers should not be at such concentration as to function as curing agents for the film forming polymers.

Even though various blends of polymeric materials can be used with the epoxy novalac film forming polymer, it is preferred that the polyvinyl pyrrolidone polymer should not be used in the present sizing composition in an unplasticized state. Polyvinyl pyrrolidone has been used in the past as a film former in sizing compositions for glass fibers. The presence of polyvinyl pyrrolidone in the aqueous sizing composition would produce a film on the treated glass fibers with an undesired degree of hardness compared to a film where the plasticized polyvinyl pyrrolidone is present. Even though the polyvinyl pyrrolidone may be present in a plasticized state, no additional advantages are achieved in wettability over treating compositions without plasticized polyvinyl pyrrolidone.

In addition to the film forming polymer present in the aqueous treating composition for treating glass fibers, there is also present a copolymer of ethylene oxide and a hydrophobic and/or lipophilic alkylene oxide. The copolymer can be a graft copolymer or block copolymer having a general formula of $(A)_x(B)_y$ or $(A)_x(B)_y(A)_x$ or $[(A)_x(B)_y]_n$ (Formula 1), where x and y are greater than about 10. The copolymers useful in the present invention do not include those having structures like alternating copolymers, where the structure of the polymer would result in a decrease of polar character. The amount of the ethylene oxide present in the copolymer is in the range of about 10 to about 40 weight percent of the copolymer. The amount of ethoxylation should be in the range of around that amount which is sufficient to make the copolymer water soluble. Nonexclusive examples of the alkylene oxide which is hydrophobic and lipophilic include propylene oxide (1,2-epoxy) propane, butylene oxide, styrene oxide and cyclohexane oxide. The polyethylene oxide-containing polyalkylene oxide block copolymers can be obtained by reacting the hydrophilic/lipophilic oxide with compounds containing an active hydrogen such as glycols to form a series of polyoxyalkylene hydrophobes. These polyoxyalkylene glycols are then made solubilizable in water by ethoxylation where the molecular weight of the copolymer is limited to be within the range of about 1500 to about 4,000 weight average molecular weight. Lower molecular weight materials do not have sufficient hydrophobic/lipophilic character for use in the present invention and materials with a higher molecular weight do not provide any additional benefit. An example of a polyoxyalkylene-polyoxyethylene copolymer that can be used has a chemical structural formula such as: $HO-(CH_2CH_2O)_a$—(hydrophobic/lipophilic alkylene oxide)$_b$ $(CH_2CH_2O)_c$ H (Formula 2) where b is at least 10 and a and c are such that the polyoxyethylene amounts to 10 to 40 percent of the total weight. Formula 2 is an example of an "aba" type block copolymer or as referred to above in Formula 1 an $(A)_x(B)_y(A)_x$ type copolymer.

The amount of the polyalkylene oxide-ethylene oxide material used in the aqueous treating composition to treat the glass fibers of the present invention is an effective lubricating amount. The effective lubricating amount is an amount greater than any effective emulsifying amount, since the materials have some surface active characteristics and exhibit some surfactant properties. Typically, the effective lubricating amount is from about 25 to around 150 weight percent of the solids of the epoxy novalac polymer or any blend of polymers with the epoxy novalac polymer. This effective lubricating amount is in excess of an emulsifying amount which is usually no greater than around 5 to 10 weight percent of the solids of the film forming polymer. The polyalkylene oxide-ethylene oxide material has a dual function of lubrication and contributing to better wettability and reduced resin demand of the treated strand.

A particularly useful poly(alkylene oxide-ethylene oxide) copolymer is that commercially available from BASF Wyandotte Corporation, Wyandotte, MI 48192 under the chemical name polyoxypropylene-polyoxyethylene condensate having the formulae $HO(CH_2CH_2O)_8$ $(CH_3CHCH_2O)_{30}$ $(CH_2CH_2O)_8H$ and available under the mark "Pluronic L-62 LF" material. This material has an average molecular weight of 2500 and a specific gravity at 25° C. of 1.03, preferably the material is used in an amount in the range of about 30 to 100 weight percent of the solids of the epoxy novalac polymer or a blend of polymers with epoxy novalac in the aqueous treating composition.

In addition, mixtures of the ethylene oxide alkylene oxide block copolymers can be used. When the ethylene oxide-containing block copolymers are incorporated into the aqueous treating composition, they should not be added directly to the film forming polymer or to the emulsion of the film forming polymer since the amount of water needed to solubilize, emulsify or disperse these materials would not be present in the film forming emulsion or with the film forming polymer.

An additional ingredient in the aqueous treating composition used in the present invention is a glass fiber coupling agent, which can be an organo silane coupling agent, or a Werner complex coupling agent. Examples of the organo silane coupling agent include those compounds having one portion of the molecule having a highly hydrolyzable group such as: $-SiOR$, wherein R is an alkyl having 1 to 5 carbon atoms, preferably 1 to 2 carbon atoms. It is desirable for the other portion of the molecule to be reactive with the resin matrix and have one or more groups, such as vinyl, acrylic, amino and epoxy groups. It has been found that silane coupling agents such as glycidoxy alkyl trialkoxy silanes, methacryloxy alkyl trialkoxy silanes and amino alkyl trialkoxy silanes are of particular utility in bonding the fibers to the resin matrix. More particularly, gammaaminopropyltrimethoxy silane, methacryloxypropyltrimethoxy silane and glycidoxypropyltrimethoxy silane are useful for this purpose. Most of the hydrolyzable silane coupling agents can be hydrolyzed by adding an organic acid such as acetic acid to the coupling agent and stirring for a sufficient time at a sufficient temperature to hydrolyze the "—Si(OR)$_3$" group to form —SiOH groups on the silane molecule along with the formation of alcohol. Sufficient water is used in its hydrolysis to impart sufficient activity to the organic acid. The complex compounds of the Werner-type can be used as coupling agents and these compounds have a trivalent nuclear atom such as chromium, which is coordinated with organic acid such as methacrylic acid to form a methacrylic acid complex of chromium chloride, for instance. Such agents are described in U.S. Pat. No. 2,611,718. Other Werner-type coupling agents having vinyl alkyl, amino, epoxy, mercaptyl, thioalkyl, thioaryl and phenyl groups are also suitable for incorporation into the aqueous sizing composition used in the present invention. On the basis of the size ingredients other than water, the coupling agent is used in an amount of about 1 to about 10 weight percent of the nonaqueous materials. Based on the aqueous treating composition, the amount is usually in the range of about 0.1 to 3 weight percent. The preferred coupling agent is the silane coupling agent methacryloxypropyltrimethoxy silane available from Union Carbide under the trade designation A-174.

Another additional component that can be used, and preferably is used, in the aqueous treating composition used in the present invention may be a glass fiber lubricant. Lubricants which impart lubricity to the strand and/or which aid in further processing by increasing strand integrity are typically of two classes: nonionic water insoluble lubricants and water soluble cationic lubricants. The water insoluble lubricant is typically a hydrogenated or saturated fatty acid ester of glycerol. Fatty acids by definition have 4 to 26 carbon atoms. It is also possible that nonionic lubricants like substantially saturated fatty triglycerides can be used in the composition to reduce the oxidation of the sizing composition. The acid constituent of the saturated fatty acid esters usually have as a majority of their acid constituent, acids having more than 12 to 20 carbon atoms with only trace amounts of the lower and higher molecular weight acids being present. The use of the saturated fatty triglyceride lubricants has been limited somewhat because of the difficulty in obtaining a stable homogeneous sizing composition, when using the fatty triglycerides. This is probably due to the high degree of hydrophobicity of the acid lubricant.

The cationic lubricant is typically the amine salt of a fatty acid, where the fatty acids have from 4 to 26 carbon atoms. However, it is preferable that the fatty acid moiety of the salt have between about 12 to 22 carbon atoms. The amines useful for forming the salt are tertiary amines of substantially low moelcular, i.e., the alkyl groups attached to the nitrogen atoms should have between 1 and 6 carbon atoms. This cationic lubricant aids in the processing of the glass fibers into strand and into roving formed therefrom by imparting slip to the exterior of the strand or roving as it passes over various types of processing equipment. Other types of lubricants that can be used include cationic lubricants like cetyl or stearyl monoamine hydrochloride or acetate, decylamine, hexadecylamine and secondary and tertiary derivatives of the same, for example, dodecyl methylamine and salts thereof. Also useful are quaternary ammonium compounds such as the trimethylstearyl ammonium bromides and chlorides and generally any of the amine compounds which dissociate in aqueous systems to provide a positive radical containing a group of more than 10, preferably 12 or more carbon atoms. Other various conventional glass fiber textile lubricants can be used. The lubricant can be a commercially available acid solubilized, fatty acid amide. This includes both saturated and unsaturated fatty acid amides, wherein the acid group contains 4 to 24 carbon atoms. Also included are anhydrous, acid solubilized polymers of the lower molecular weight unsaturated fatty acid amides. A suitable material is the pelargonic acid amide of tetraethylene pentamine. Other glass fiber lubricants which may be used are the alkyl imidazoline derivatives which includes compounds of the glass N-alkyl, N-amido alkyl imidazolines which may be formed by causing fatty acids to react with polyalkylene polyamines under conditions which produce ring closure. The reaction of tetraethylene pentamine with stearic acid is exemplary of such reaction. These imidazolines are described more fully in U.S. Pat. No. 2,200,815. Other suitable imidazolines are described in U.S. Pat. Nos. 2,267,965; 2,268,273 and 2,355,837.

Preferably the lubricant is a cationic lubricant that is used in an amount from about 0.5 to about 2 percent by weight and preferably from about 0.5 to about 1.5 percent by weight based on the ingredients of the sizing composition other than water. The preferred cationic lubricant used in the present invention is that which is a viscous liquid having partially amidated polyamines, a mixture of primary, secondary and tertiary amines available from Emery Chemical Company under the trade designation Emery 6717 lubricant.

In addition to the aforementioned components of the aqueous chemical treating composition, the composition may contain one or more emulsifiers for imparting further stability to the aqueous chemical treating composition. The emulsifiers can be nonionic or cationic and these emulsifiers are those known to those skilled in the art. Also wetting agents can be incorporated into the aqueous treating composition. A typical wetting agent being octyl phenoxy propylethyleneoxyethanol available commercially under the trade designation Igepal ®CA 630 manufactured by GAF Corporation. In addition, an anti-foaming agent may be present, and preferably is present, where the anti-foaming agent is a silicone anti-foaming agent such as SAG ®10 manufactured by Union Carbide Corporation.

In preparing the aqueous chemical treating composition used in the present invention it is desirable that the solids content of the chemical composition are such that the viscosity of the chemical composition is suitable for applying the composition to glass fibers. Solutions having high viscosities are difficult to apply to glass fibers during their formation into strands without breaking the fibers. The solids of the treating composition should result in a viscosity in the range of about 1 up to around 100 centipoise at room temperature of around 20° C. to 25° C. It is preferred that the viscosity is between about 1 and about 20 centipoise. Most preferably, the viscosity of the aqueous chemical treating composition is in the range of 1.75±0.15 centipoise at 21° C. in Brookfield viscometer with a UL adapter at an rpm of 30. The viscosity of the aqueous chemical treating composition can be increased by the use of appropriate thickening agents to the point where the composition in the form of a gel is applied to the fibers. Typically, the solids can be in the range of about 1 to about 25 percent by weight and preferably about 4 to about 13 weight percent and most preferably about 9 to about 10.5 weight percent. Sufficient water is added to the aqueous chemical treating composition to give a total solids within the desired range. The aqueous chemical treating composition is applied to filamentary material to obtain a solids application of about 0.5 to about 2 percent by weight (LOI) based on the total weight of the fibers and the aqueous treating composition and preferably between about 0.4 and 1.5 and most preferably about 0.5 to about 0.7 weight percent of the treated fiber or strand. The pH of the aqueous treating composition should be controlled between about 3 to about 7 and preferably about 4.6 to about 5.2 when the silane coupling agent methacryloxypropyltrimethoxy silane is used.

Although the aqueous treating composition of the present invention is chiefly used in manufacturing treated glass fibers and strands, it is within the scope of the present invention to produce treated filamentary material such as thermoplastic synthetic fibers like polyesters, nylon, and cellulose acetate. It is preferred to apply the aqueous chemical treating composition to glass fibers during the formation of the glass fibers although the chemical composition can be applied to glass fibers after their formation and even when the glass fibers are in the form of strands, for example, like strands in a continuous strand mat. The glass fibers on which the chemical treating composition is applied can be any glass fiber produced from fiberizable heat softened glass, for example, the well known fiberizable glass compositions like "E-glass" and "621-glass". Also, any more environmentally acceptable derivatives of "E-glass" and "621-glass" can be used such as low or free fluorine and/or boron fiberizable glass compositions.

The aqueous treating composition can be applied to the glass fibers by any method known to those skilled in the art. The glass fibers treated with the aqueous chemical treating composition can be of any filamentary diameter known to those skilled in the art and the treated glass fibers can be gathered into one or more strands of any construction known to those skilled in the art. The aqueous chemical treating composition can be prepared by adding the components sequentially or simultaneously to a desired amount of water or a fraction of the desired amount of water to achieve the total volume of the aqueous treating composition. When a fraction of the desired amount of water is used, that fraction must be sufficient for solubility or dispersibility of the components and then the additional water needed to make up the desired volume is subsequently added.

PREFERRED EMBODIMENT

The preferred components of the aqueous treating composition are: the aqueous emulsion of an epoxy novalac polymer, poly(propylene oxide-b-polyethylene oxide)glycol having around 27 weight percent ethylene oxide functionality, methacryloxypropyltrimethoxy silane, amidated polyamine lubricant, acetic acid as the organic acid for hydrolyzing the silane coupling agent and a silicone anti-foaming agent. The formulation of the aqueous treating composition of the preferred embodiment is given in Table I.

TABLE I

| 37.854 Liter Volume of Aqueous Treating Composition | | | |
|---|---|---|---|
| Components | Amount (gm) | Wt % Aq | Wt % Solids |
| Nonionic aqueous dispersion of an epoxy novalac polymer (CMD-W 55-5003 epoxy resin) | 4454 | 6.47 | 65.8 |
| Polyoxypropylene-polyoxyethylene copolymer (Pluronic L-62LF polyglycol) | 1000 | 2.64 | 26.9 |
| Amidated polyamine glass fiber lubricant (Emery 6717 lubricant) | 25 | 0.06 | 0.67 |
| Gamma methacryloxypropyltrimethoxy silane | 300 | 0.48 | 6.6 |
| Acetic acid | 25 | 0.06 | 0 |
| Silicon defoaming agent | 5 | 0.01 | 0.3 |
| Water | 32000 ml | 84.67 | — |
| Properties: | | | |
| Solids | 9.83% | | |
| pH | 4.95 | | |
| Viscosity CPS, UL 30 RPM | 1.77 | | |
| Average Particle size, μ | 1.63 | | |

The preferred method of preparing the aqueous chemical treatment used in the present invention and the method used to produce the chemical treatment, the formulation of which is given in Table I, involves the following steps. Cold, deionized water (60° to 80° F. (16° to 27° C.)) is added to a premix tank. Although deionized water is preferred, distilled or even city water can be used. The poly(propylene oxide-b-ethyleneoxide)glycol is added to this premix tank with stirring for about 20 minutes to produce a mixture that is still cloudy. The amount of water to which the polyglycol is added can be around 25 weight percent of the total water needed to make up the desired volume of aqueous chemical treating composition. In preparing the aqueous treating composition, the polyglycol may not dissolve completely in water but it will readily disperse in water. If hot water (140° to 160° F.) is used to attempt to dissolve it, stability problems can occur when the epoxy emulsion is added to a large volume of hot water.

To a main mix tank, there is added about 40 weight percent of the total water to be used in the aqueous treating composition, where the water is cold, deionized water. To the water, there is added the indicated amount of acetic acid and slowly the silane coupling agent is added to the mixture in the mix tank. The mixture is stirred so as not to induce air for about 10 minutes or until clear-blue.

To a premix tank, the epoxy novalac emulsion that is 55 percent nonvolatiles is added and about 10 percent by weight of the water of the final treating composition is added as cold, deionized water. The mixture is stirred until mixed with no apparent lumps and then this mixture is added to the mixture in the main mix tank.

To another premix vessel, the amidated polyamine lubricant is added and about 1 percent of the total water in the composition is added as hot, (140° to 160° F. (60° to 71° C.)) deionized water. The mixture is stirred for around 15 minutes or until clear-yellow. The polyglycol mixture from the premix tank is then added to the mixture in the main mix tank and the lubricant mixture is added to that mixture in the main mix tank. The antifoaming agent is mixed with an equal amount of cold, deionized water and is added to the main mix tank. The final mixture is then diluted to the final volume with cold deionized water and the total mixture is agitated for 5 minutes.

The preferred ranges for properties for the aqueous chemical treating composition are total solids of the final mixture in the range of about 9 to about 10 weight percent, and the pH in the range of about 4.6 to about 5.2 and the viscosity as measured in a Brookfield viscometer with a UL adapter at 30 rpm in centipoise at 70° F. (21° C.) is 1.60 to 1.90. The specific gravity at 70° F. (21° C.) is 1.012±0.001. The particle size of the aqueous treating composition is 2.0 microns as a maximum.

This treating composition is used to treat glass fibers during their formation, where the glass fibers range in filament diameter from about 2 to around 30 and preferably from about 5 to about 24 microns and the filaments are gathered into strands having a construction of about 200 to around 4,000 or more filaments. The glass fibers are pulled from the glass melting furnace at a suitable speed to produce the filament diameter desired, and to provide for an amount of aqueous chemical treatment to be applied to the fibers. The amount is that which results in an LOI for a dried strand in the range of about 0.1 to about 2 weight percent of the treated strand. A typical speed for attenuating fibers is provided by a winder having a collet of 20.32 cm that rotates at about 4,100 rpm. The package of continuous strand is removed from the winder and is dried for a suitable time at a suitable temperature to produce a moisture within the package of about 2 to about 10 weight percent, preferably 2 to about 8 weight percent. The percent LOI of the formed strands is preferably in the range of about 0.55±0.15. Preferably, the drying time is about 16 hours in a Michigan oven at a drying temperature of around 270° F. (132° C.). It is preferred to use the aqueous chemical treating compositions to treat K-6.75 direct draw roving. The initial moisture of the strand before drying is around 7 to 8 percent based on the package produced and the moisture after drying is around 0.02 percent of 0.04 percent with an average moisture of 0.022 percent.

The glass fibers with a dried residue of the aqueous treating composition can be used for reinforcing thermosetting and thermoplastic polymeric matrices by any method known to those skilled in the art. Nonexclusive examples of the thermosetting polymers that can be reinforced with the glass fibers are: polyesters, epoxies, phenolic aldehyde condensates, melamine aldehyde condensates, urea aldehyde condensates, nylon, polycarbonate, and vinyl esters and the like, while the thermoplastics can be nylon, polycarbonate and the like. Preferably, vinyl esters are reinforced with the glass fibers in a filament winding operation, pultrusion operation, or lay-up operation. In these operations, the treated glass fibers will be conveyed from a source such as a package of glass fiber strands and impregnated in a liquid polymeric bath which is preferably a vinyl ester resin bath. The liquid polymeric bath like the vinyl ester resin bath would have a formulation of liquid curable polymer along with one or more curing agents, pigments, anti-foaming agents, and the like. The impregnated glass fiber strands can be shaped through a die or on a mandrel and subsequently cured.

The following examples are provided to illustrate the filamentary material of the present invention and the preferred embodiment.

The aqueous chemical treating composition of Table I was used to produce treated glass fibers in a K-6.75 strand by the method described in the preferred embodiment section of this application. In addition, dried treated glass fiber strands were prepared in accordance with the method of the preferred embodiment having a construction of K-6.75 that had been treated with an aqueous chemical treatment of Table II. The example from Table II differs from the example of Table I in that a blend of epoxy novalac emulsion and a bisphenolic epoxy emulsion in a ratio of 50:50 was used.

TABLE II

| 37.854 Liter Volume of Aqueous Treating Composition | | | |
|---|---|---|---|
| Components | Amount (gm) | Wt % Aq | Wt % Solids |
| Nonionic aqueous dispersion of an epoxy novolac polymer (CMD-W 55-5003 epoxy resin) | 2227 | 3.24 | 32.9 |
| Aqueous emulsion of bisphenolic epoxy polymer | 2227 | 3.24 | 32.9 |
| Polyoxypropylene-polyoxyethylene copolymer (Pluronic L-62LF polyglycol) | 1000 | 2.64 | 26.9 |
| Amidated polyamine glass fiber lubricant (Emery 6717 lubricant) | 25 | 0.06 | 0.7 |
| Gamma methacryloxypropyltrimethoxy silane | 300 | 0.48 | 6.6 |
| Acetic acid | 25 | 0.06 | 0 |
| Silicon defoaming agent | 5 | 0.01 | 0.03 |
| Water | 32000 ml | 84.67 | — |

Dried glass fiber strands having the dried residue of the aqueous chemical treating compositions of Example I and Example II were used to prepare fiber glass reinforced vinyl ester polymeric composites. Also a commercial product available under the trade designation 439 strand from Owens-Corning Fiberglas Corporation was used to repair fiber glass reinforced vinyl ester composites. The vinyl ester composites were prepared with the use of Epocryl 325 resin from Shell Chemical Company. The catalyst used was about 1 percent t-butyl perbenzoate and 0.5 percent mole release agent was also used. The process of preparing the vinyl ester composites involved contacting the dried continuous glass fiber strands of Example I, II, and the commercially available sample with the polymeric matrix formulation and conveying the coated glass fiber strands through dyes and winding the coated glass fiber strands onto a mandrel to produce the fiber reinforced polymeric material.

In the process of preparing the vinyl ester reinforced polymeric matrix, the processing properties of the dried glass fiber strands were evaluated for the dried glass fiber strands of Example I and the commercially available sample. The processing properties which were evaluated include wet-out, resin demand, fuzz generation, and cylinder-wet-out. In evaluating the processing properties, the polymeric matrix formulation was an uncatalyzed formulation of the Shell Epocryl 325 resin.

The wet-out test involves determining the wet-out of rovings of the dried glass fiber strands of Example I and the commercially available sample when the rovings are pulled at a slow, fixed rate through a metal trough of uncatalyzed matrix resin. Wettability of the roving is measured in terms of a numerical index that reflects the distance traversed by the roving within the trough at the moment complete wet-out occurs. Wet-out is evidenced by complete saturation of the roving strands by the resin, such that the roving "tends to disappear" within the resin. The resin demand test was conducted in conjunction with the wet-out test, where the percent resin demand is the weight of the resin contained in a specific sample as determined from the weight of the glass fibers before application of the resin and the weight of the glass fibers after application of the resin.

The apparatus for the wet-out test consists of a metal trough filled with steel guide rods traversing the trough at two inch intervals. A large wooden drum mounted at one end of the trough is driven at a fixed speed of 1 linear foot per minute by means of a suitable electric motor. The drum measures 22½ inches in diameter and is used to draw the roving through the vinyl ester resin contained by the trough. The test sample consisted of one or more packages of roving of the dried glass fiber strands of Example I and the commercially available sample. The procedure involves removing approximately 20 feet of roving from the center of the sample and threading the end of the roving through the guide eye of the apparatus and over and under the guide rods and taping the sample to the pulling drum. The trough is filled with the vinyl ester polymer to a level necessary to cover all of the roving on the guide rods. The motor for the drum is started and the drum rotates and smoothly pulls the roving through the trough and onto the take-up drum. The roving runs through the trough and the first point along the trough at which the roving is completely wet-out is observed. The position of complete wet-out in the trough is recorded by referencing the number of the guide rod closest to this point. Higher numbers indicate rapid wet-out and lower numbers reflect slow wet-out of the specimen. In Table I, for the processing properties of the Example I roving and the commercially available roving, the wet-out was observed at about 95% and 100%. Also, the percent resin demand is given in Table I where the lower numbers indicate a reduced amount of resin demand. Also reported in Table I is the fuzz generation of the samples which was conducted by the (NOL) test, which is well known to those skilled in the art.

TABLE 1

| | PROCESSING PROPERTIES | | |
|---|---|---|---|
| | Wet-Out 95%–100% | % Resin Demand | Fuzz Generation (NOL) |
| Example I Roving | 23–21 | 30.8 | Slight |
| Commercial Sample | 23–12 | 34.3 | Slight |
| Example II Roving A | 22–16 | 29.6 | Moderate |
| Example II Roving B₁ | 23–22 | 31.5 | Slight |

₁This roving differed from Example IIA roving only in that it was dried by dielectric drying rather than forced air drying.

TABLE 2

| | COMPOSITE PROPERTIES | | | | | | | | | | |
|---|---|---|---|---|---|---|---|---|---|---|---|
| SAMPLE IDENTITY | RING TENSILE STRENGTH, $10^3$ PSI | | | | F.T. REINFORCED STRENGTH, $10^3$ PSI | | STRENGTH RETENTION, PERCENT | HORIZONTAL SHEAR STRENGTH, $10^3$ | | | |
| | DRY | % C | WET | % COV | DRY | WET | | DRY | % COV | WET | % COV |
| Vinyl Ester Composite Reinforced with following glass fiber strand | | | | | | | | | | | |
| Example I | | | | | | | | | | | |
| Sample 1 | 190 | 3.62 | 185 | 2.45 | 323 | 316 | 97.4 | 9.01 | 2.76 | 8.75 | 3.52 |
| Sample 2 | 193 | 3.48 | 193 | 2.42 | 321 | 321 | 100 | 9.03 | 2.57 | 8.58 | 3.24 |
| Example IIA | | | | | | | | | | | |
| Sample 1 | 162 | 5.96 | 166 | 2.87 | 279 | 285 | 102* | 7.02 | 4.21 | 6.41 | 8.61 |
| Sample 2 | 172 | 8.9 | 183 | 2.69 | 289 | 303 | 106* | 6.74 | 3.54 | 5.97 | 5.27 |
| Example IIB | | | | | | | | | | | |
| Sample 1 | 182 | 2.66 | 189 | 3.25 | 306 | 318 | 104* | 7.75 | 4.28 | 7.34 | 4.49 |
| Sample 2 | 192 | 3.0 | 197 | 1.46 | 317 | 326 | 103* | 7.62 | 5.47 | 7.35 | 3.53 |
| Commercial Sample | | | | | | | | | | | |
| Sample 1 | 178 | 4.36 | 177 | 0.680 | 337 | 335 | 99.4 | 8.96 | 4.54 | 8.80 | 6.00 |
| Sample 2 | 178 | 3.25 | 172 | 4.86 | 337 | 323 | 96.6 | 8.96 | 6.89 | 9.17 | 6.01 |

| | STRENGTH RETENTION, PERCENT | GLASS CONTENT % BY WEIGHT | VOID CONTENT % BY VOLUME | SPECIFIC GRAVITY |
|---|---|---|---|---|
| Example I | | | | |
| Sample 1 | 97.1 | 77.4 | 4.34 | 1.930 |
| Sample 2 | 95.0 | 78.6 | 4.47 | 1.950 |
| Example IIA | | | | |
| Sample 1 | 91.3 | 79.4 | 9.11 | 1.870 |
| Sample 2 | 88.6 | 80.6 | 8.26 | 1.910 |
| Example IIB | | | | |
| Sample 1 | 94.7 | 78.6 | 4.47 | 1.950 |
| Sample 2 | 96.5 | 79.2 | 4.05 | 1.970 |
| Commercial Sample | | | | |
| Sample 1 | 98.2 | 74.3 | 6.33 | 1.835 |
| Sample 2 | 102* | 74.3 | 5.56 | 1.850 |

*An anomolous value due to increase cure of test specimen during water-boil cycle for wet strength values.

The fiber glass rovings of Example I, II and the commercially available sample were used to prepare the vinyl ester glass fiber reinforced composites. These composites were prepared with the matrix formulation having the catalyst and the mold release agent. These composites were tested for physical properties by the ring tensile and F.T. reinforcement strength tests in accordance with the method of the American Society of Testing Materials (ASTM) test D2290-76. Also, the horizontal shear strength of the composites was tested according to ASTM test D2344-76. In determining the strength properties of the composite, the glass content and void content and specific gravity of the composites were also determined. The strength properties and the glass content, void content and specific gravity of the composite are shown in Table 2. In Table 2, the glass fiber strands of Example I, IIA and IIB were all of the K-6.75 type. The K signifies that the fibers making up the strands had a filament diameter of around 13.34±0.63 microns. In Table 2, the wet strengths were measured after the composite was boiled in water for 2 hours for the ring strength and after the composites were boiled in water for 6 hours for the shear strength.

The foregoing has described the invention of dried glass fibers having the dried residue of an aqueous treating composition having a water dispersible, emulsifiable or soluble epoxy novalac polymer, or blend of epoxy novalac polymer and epoxy or vinyl acetate polymers and poly(oxyalkylene-oxyethylene)polyol copolymers, glass fiber coupling agent, glass fiber lubricant and water. The dried glass fiber strands are useful in reinforcing thermosetting and thermoplastic polymers and chiefly vinyl ester polymeric matrices.

I claim:

1. One or more glass fibers having at least a portion of their surfaces covered with an aqueous chemical treating composition, comprising:
   a. a water dispersible, emulsifiable or soluble epoxy novalac film forming polymer,
   b. glass fiber coupling agent,
   c. water soluble, dispersible or emulsifiable poly(oxyalkylene-oxyethylene)polyol copolymer having ethylene oxide present in an amount in the range of about 10 to about 40 weight percent of the copolymer, wherein the copolymer is present in an effective lubricating amount in the aqueous treating composition,
   d. water in an amount to allow the aqueous treating composition to be applied to the fibers.

2. Treated glass fibers of claim 1, wherein the amount of epoxy novalac in the aqueous chemical treating composition is in the range of about 1 to about 15 weight percent of the aqueous treating composition.

3. Treated glass fibers of claim 1, wherein the epoxy novalac polymer has the formula:

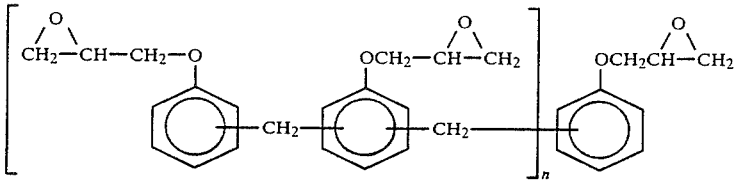

wherein n ranges from about 2 to about 5 and wherein the epoxy novalac equivalent weight ranges from about 193 to 600 weight average molecular weight.

4. Treated glass fibers of claim 1, wherein the film cast from the epoxy novalac polymeric emulsion having about 55 weight percent solids has an infrared spectra as shown in FIG. 1.

5. Treated glass fibers of claim 1, wherein the epoxy novalac polymer and the aqueous treating composition has a formula:

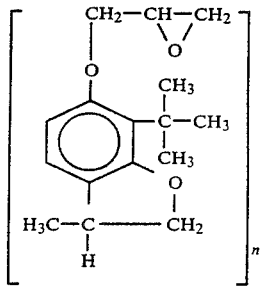

wherein n has a value of from about 2 to about 5.

6. Treated glass fibers of claim 1, wherein the epoxy novalac polymer is present as a blend of water dispersible, soluble or emulsifiable epoxy polymer and water soluble, dispersible or emulsifiable novalac polymer, where the blend has a similar epoxy equivalent weight to the epoxy novalac polymer and the novalac polymer has a weight average molecular weight similar to the epoxy novalac polymer.

7. Treated glass fibers of claim 1, wherein the epoxy novalac polymer is present in a blend with water soluble, dispersible or emulsifiable epoxy polymers.

8. Treated glass fibers of claim 1, wherein the epoxy novalac polymer is present in a blend with a water soluble, dispersible or emulsifiable poly(vinyl acetate) polymer.

9. Treated glass fibers of claim 1, wherein the aqueous treating composition is essentially free of unplasticized poly(vinyl pyrrolidone).

10. Treated glass fibers of claim 1, wherein the glass fiber coupling agent is a methacryloxy alkyl trialkoxy silane which has been hydrolyzed.

11. Treated glass fibers of claim 10, wherein the coupling agent is gamma methacryloxypropyltrimethoxy silane which has been hydrolyzed.

12. Treated glass fibers of claim 1, wherein the alkylene oxide portion of the copolymer is selected from the group consisting of propylene oxide, butylene oxide, styrene oxide and cyclohexane oxide.

13. Treated glass fibers of claim 1, wherein the effective lubricating amount of the poly(oxyalkylene-oxyethylene)polyol copolymer is from about 25 to around 50 weight percent of the solids of the epoxy novalac polymer or any blend of epoxy and novalac polymers or blend of polymers with the epoxy novalac polymer.

14. Treated glass fibers of claim 1, wherein the molecular weight of the poly(oxyalkylene-oxyethylene)polyol copolymer is at least 1500 weight average molecular weight.

15. Treated glass fibers of claim 1, wherein the poly(oxyalkylene-oxyethylene)polyol copolymer is a poly(oxypropylene-oxyethylene)polyol copolymer having a formula

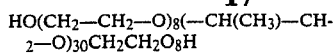

having a molecular weight of around 2500, a specific gravity at 25° C. of around 1.03 having a solubility in water greater than 10 grams per 100 milliliter having a flash point of 466° F.

16. Treated glass fibers of claim 1, wherein the aqueous treating composition has a solids content of about 9 to about 10 percent and a pH of about 4.5 to about 6.

17. Treated glass fibers of claim 1, wherein the dried residue of the aqueous treating composition is present on the glass fibers in a range of about 0.1 to about 2 weight percent of the treated glass fibers.

18. Treated glass fibers of claim 1, having a moisture content in the range of about 2 to about 10 weight percent.

19. One or more glass fibers having at least a portion of their surfaces covered with the dried residue of an aqueous chemical treating composition, comprising:

a. a nonionic emulsion of an epoxy novalac film forming polymer having around 55 weight percent solids, wherein the epoxy novalac polymer has a formulation selected from the group consisting of of about 10 to about 40 weight percent of the copolymer and the oxyalkylene as selected from the group consisting of propylene oxide, butylene oxide, styrene oxide and cyclohexane oxide where the copolymer is present in an effective lubricating amount in the aqueous treating composition, d. water in an amount to allow the aqueous treating composition to be applied to the fibers, wherein the aqueous treating composition is essentially free of unplasticized polyvinyl pyrrolidone and has a pH in the range of about 4.6 to about 5.2 and the solids content is in the range of about 9 to about 10 and the dried residue on the glass fiber is present in an amount of about 0.1 to about 2 weight percent of the treated glass fibers.

20. Process of preparing vinyl ester polymeric material reinforced with the treated glass fibers of claim 1, comprising:

a. conveying treated glass fibers with the dried residue of the aqueous treating composition from a source, b. immersing the continuous treated glass fibers in contact with a curable vinyl ester polymeric material, removing the treated glass fibers with a coat-

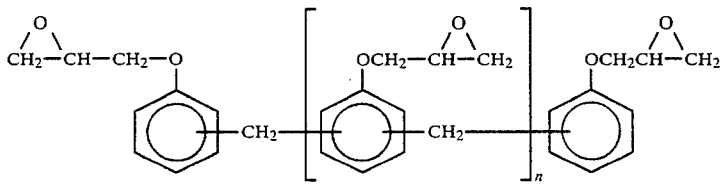

and,

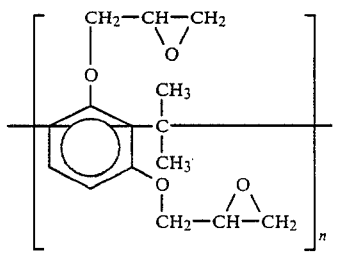

wherein, n is an integer within the range of about 2 to about 5 present in an effective film forming amount, b. hydrolyzed, methacryloxy alkyl trialkoxy silane coupling agent, c. water soluble, dispersible, or emulsifiable poly(oxyalkylene-oxyethylene)polyol copolymer having an ethylene oxide present in an amount in the range ing of the curable vinyl ester polymeric material from the cited immersion, and d. collecting the coated, treated glass fiber strands into a sheet and, e. curing the coated, treated glass fibers into a reinforced vinyl ester composite.

* * * * *

UNITED STATES PATENT AND TRADEMARK OFFICE
CERTIFICATE OF CORRECTION

PATENT NO. : 4,487,797

DATED : December 11, 1984

INVENTOR(S) : James C. Watson

It is certified that error appears in the above-identified patent and that said Letters Patent is hereby corrected as shown below:

Column 16, line 56, delete "50" and insert --150--.

Signed and Sealed this

Seventh Day of May 1985

[SEAL]

Attest:

DONALD J. QUIGG

Attesting Officer

Acting Commissioner of Patents and Trademarks